(12) United States Patent
Ai

(10) Patent No.: US 10,462,345 B2
(45) Date of Patent: Oct. 29, 2019

(54) DEFORMABLE STRUCTURE THAT COMPENSATES FOR DISPLACEMENT OF A CAMERA MODULE OF A CAMERA ACCESSORY

(71) Applicant: Essential Products, Inc., Palo Alto, CA (US)

(72) Inventor: Jiang Ai, San Jose, CA (US)

(73) Assignee: ESSENTIAL PRODUCTS, INC., Palo Alto, CA (US)

( * ) Notice: Subject to any disclaimer, the term of this patent is extended or adjusted under 35 U.S.C. 154(b) by 0 days.

(21) Appl. No.: 16/102,585

(22) Filed: Aug. 13, 2018

(65) Prior Publication Data

US 2019/0052785 A1 Feb. 14, 2019

Related U.S. Application Data

(60) Provisional application No. 62/544,713, filed on Aug. 11, 2017.

(51) Int. Cl.
| | |
|---|---|
| *H04N 5/225* | (2006.01) |
| *G02B 7/02* | (2006.01) |
| *G03B 17/56* | (2006.01) |
| *G02B 13/06* | (2006.01) |

(52) U.S. Cl.
CPC ............ *H04N 5/2259* (2013.01); *G02B 7/02* (2013.01); *G03B 17/565* (2013.01); *H04N 5/2252* (2013.01); *H04N 5/2257* (2013.01); *H04N 5/2258* (2013.01); *H04N 5/22521* (2018.08); *G02B 13/06* (2013.01)

(58) Field of Classification Search
CPC ............... H04N 5/2251; H04N 5/2252; H04N 5/22521; H04N 5/2253; H04N 5/2254; H04N 5/2257; H04N 5/2258; H04N 5/2259; H04N 5/23238; H04M 1/0264; G02B 7/02–16; G02B 13/06; G03B 17/12; G03B 17/14; G03B 37/00–06; G03B 17/565–568

See application file for complete search history.

(56) References Cited

U.S. PATENT DOCUMENTS

| | | |
|---|---|---|
| 5,063,508 A | 11/1991 | Yamada et al. |
| 6,181,329 B1 | 1/2001 | Stork |
| 6,208,435 B1 | 3/2001 | Zwolinski |
| 6,310,988 B1 | 10/2001 | Flores |
| 6,573,887 B1 | 6/2003 | O'Donnell, Jr. et al. |
| 6,972,749 B2 | 12/2005 | Hinckley et al. |
| 8,267,368 B2 | 9/2012 | Torii et al. |

(Continued)

*Primary Examiner* — Paul M Berardesca
(74) *Attorney, Agent, or Firm* — Perkins Coie LLP; Michael Glenn

(57) ABSTRACT

The disclosed teachings include a 360-degree camera accessory mountable on a smartphone. The 360-degree camera accessory includes a camera module disposed partially within the camera accessory, where the camera module including an optical lens configured to capture an image of a scene. The 360-degree camera accessory also includes a rigid structure disposed within the accessory to support the camera module, and a deformable structure disposed between a camera barrel that surrounds the optical lens of the camera module and the rigid structure. The deformable structure can compensate for movement of the camera module to improve image capturing of the scene.

20 Claims, 10 Drawing Sheets

(56) References Cited

U.S. PATENT DOCUMENTS

| | | |
|---|---|---|
| 8,560,014 B1 | 10/2013 | Hu et al. |
| D718,720 S | 12/2014 | Rader et al. |
| RE45,559 E | 6/2015 | Williams |
| 9,354,709 B1 | 5/2016 | Heller et al. |
| 9,554,041 B1 | 1/2017 | Shin et al. |
| RE46,548 E | 9/2017 | Williams et al. |
| 9,813,693 B1 | 11/2017 | Baldwin |
| 10,165,426 B1 | 12/2018 | Jiang et al. |
| 2004/0041911 A1 | 3/2004 | Odagiri et al. |
| 2007/0089527 A1 | 4/2007 | Shank et al. |
| 2007/0211573 A1 | 9/2007 | Hermansson |
| 2008/0117168 A1 | 5/2008 | Liu et al. |
| 2009/0327871 A1 | 12/2009 | Wolf et al. |
| 2010/0231687 A1 | 9/2010 | Amory et al. |
| 2010/0235732 A1 | 9/2010 | Bergman et al. |
| 2010/0321471 A1 | 12/2010 | Casolara et al. |
| 2011/0192857 A1 | 8/2011 | Rothbaum et al. |
| 2012/0029417 A1 | 2/2012 | Samain et al. |
| 2012/0033091 A1 | 2/2012 | Miyasako |
| 2012/0094773 A1 | 4/2012 | Suzuki |
| 2012/0329532 A1 | 12/2012 | Ko |
| 2013/0045774 A1 | 2/2013 | Arat |
| 2013/0088815 A1 | 4/2013 | Hu et al. |
| 2013/0180879 A1 | 7/2013 | O'Dowd et al. |
| 2013/0242040 A1* | 9/2013 | Masuda ............... H04N 5/2251 348/36 |
| 2013/0278790 A1 | 10/2013 | Oh et al. |
| 2014/0024418 A1 | 1/2014 | Hu et al. |
| 2014/0104449 A1* | 4/2014 | Masarik ............... H04N 5/2254 348/211.14 |
| 2014/0128132 A1 | 5/2014 | Cox, III |
| 2014/0200056 A1 | 7/2014 | Liu |
| 2014/0313127 A1 | 10/2014 | Deng |
| 2014/0334736 A1 | 11/2014 | Niu et al. |
| 2015/0009187 A1 | 1/2015 | Mercea et al. |
| 2015/0049243 A1* | 2/2015 | Samuels ............... G03B 17/568 348/374 |
| 2015/0067580 A1 | 3/2015 | Um et al. |
| 2015/0168486 A1 | 6/2015 | Isaac et al. |
| 2015/0180527 A1 | 6/2015 | Fathollahi |
| 2015/0261310 A1 | 9/2015 | Walmsley et al. |
| 2015/0264654 A1 | 9/2015 | Wang et al. |
| 2015/0293430 A1* | 10/2015 | O'Neill ............... G03B 17/565 396/544 |
| 2015/0295446 A1 | 10/2015 | Fathollahi |
| 2015/0309582 A1 | 10/2015 | Gupta |
| 2016/0020625 A1 | 1/2016 | Tsou |
| 2016/0049980 A1 | 2/2016 | Kim |
| 2016/0054971 A1 | 2/2016 | Yu et al. |
| 2016/0087670 A1 | 3/2016 | Lee |
| 2016/0098138 A1 | 4/2016 | Park et al. |
| 2016/0134730 A1 | 5/2016 | Lee et al. |
| 2016/0191891 A1 | 6/2016 | Gilpin |
| 2016/0216597 A1* | 7/2016 | Lim ............... G03B 17/566 |
| 2016/0219217 A1 | 7/2016 | Williams et al. |
| 2016/0286119 A1* | 9/2016 | Rondinelli ............. G03B 17/12 |
| 2016/0346494 A1 | 12/2016 | Harrison et al. |
| 2017/0006340 A1 | 1/2017 | Enke et al. |
| 2017/0054904 A1 | 2/2017 | Li et al. |
| 2017/0078653 A1 | 3/2017 | Bi et al. |
| 2017/0091153 A1 | 3/2017 | Thimbleby |
| 2017/0212670 A1 | 7/2017 | Shimizu et al. |
| 2017/0222301 A1 | 8/2017 | Shiu et al. |
| 2017/0242471 A1 | 8/2017 | Ma |
| 2017/0244934 A1 | 8/2017 | Chien et al. |
| 2017/0278262 A1 | 9/2017 | Kawamoto et al. |
| 2017/0316487 A1 | 11/2017 | Mazed |
| 2017/0318126 A1 | 11/2017 | Breitenfeld et al. |
| 2017/0330332 A1 | 11/2017 | Choi et al. |
| 2017/0339392 A1 | 11/2017 | Forutanpour et al. |
| 2018/0123253 A1 | 5/2018 | Weinmann et al. |
| 2018/0277927 A1 | 9/2018 | Mccormack et al. |
| 2018/0323834 A1 | 11/2018 | Jiang et al. |
| 2019/0004405 A1* | 1/2019 | Li ............... G02B 7/021 |

\* cited by examiner

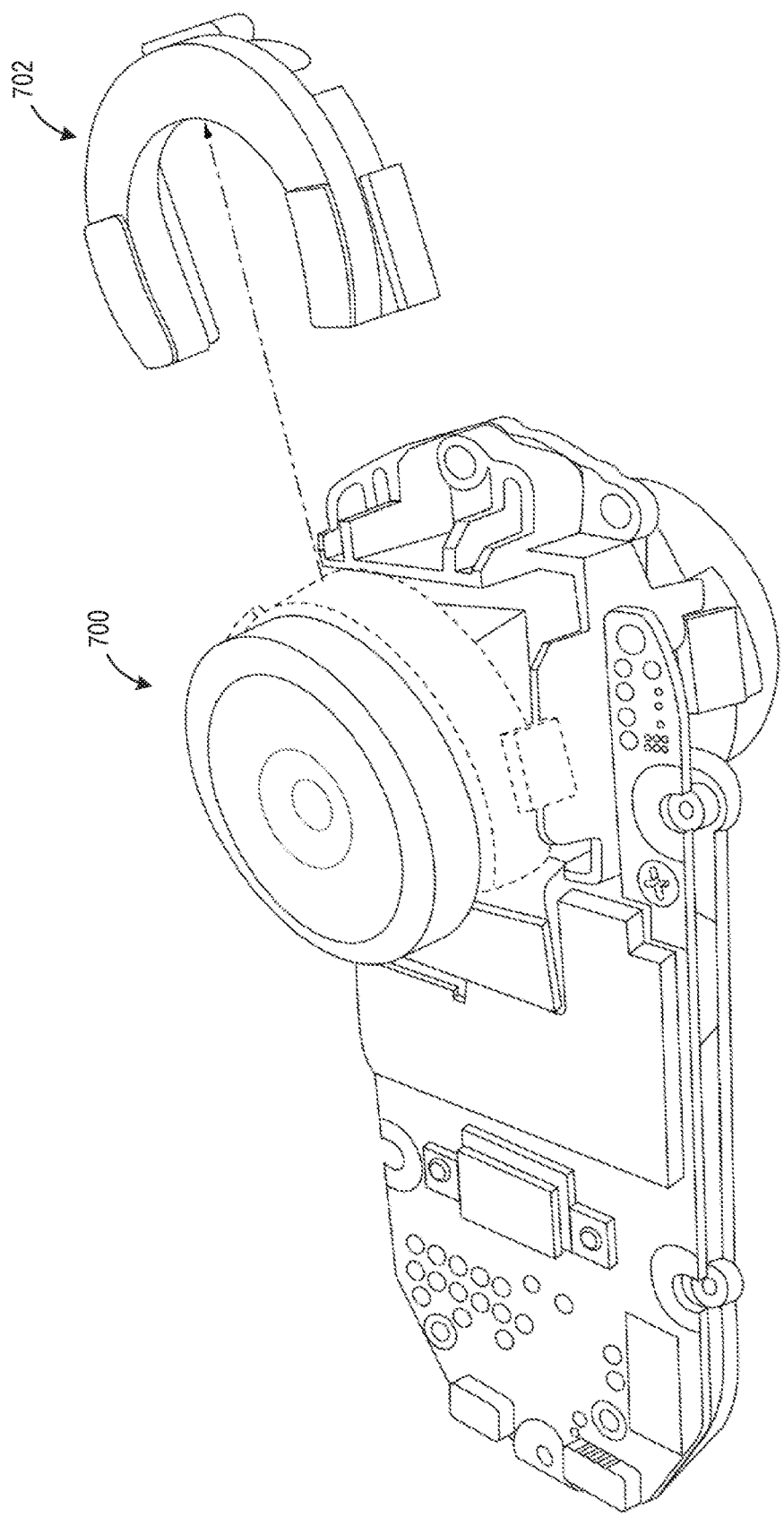

DEFORMABLE STRUCTURE THAT COMPENSATES FOR DISPLACEMENT OF A CAMERA MODULE OF A CAMERA ACCESSORY

CROSS-REFERENCE TO RELATED APPLICATION

This application claims the benefit of commonly assigned U.S. Provisional Patent Application Ser. No. 62/544,713, filed on Aug. 11, 2017, and entitled "Handheld Mobile Devices and Related Accessories," the disclosure of which is hereby incorporated herein in its entirety by reference.

TECHNICAL FIELD

The disclosed teachings generally relate to camera accessories for handheld mobile devices (e.g., smartphones). The disclosed teachings more particularly relate to a camera accessory that includes camera module(s) maintained in position with deformable structures that compensate for displacement of the camera module(s).

BACKGROUND

Examples of a handheld mobile device (HMD) include computing devices such as smart-watches, smartphones, tablet computers, and laptop computers. Examples of related accessories include cameras, speakers, and docking stations. Conventional technologies for coupling an HMD to an accessory include connecting a universal serial bus (USB) cable from a port on the HMD to a port on the accessory. Such wired connections provide high data transfer rates and can be used to transfer power but it is inconvenient and cumbersome for a user to carry a USB cable to connect the devices.

Other conventional technologies for coupling an HMD to an accessory include using a Wi-Fi or Bluetooth wireless connection, which is more convenient than relying on wired connections because the user does not need to carry a wire. However, these conventional technologies have low data transfer rates compared to wired solutions. Yet other custom technologies facilitate easily connecting an accessory to an HMD, but the connection is not robust. For example, an accessory may include a magnet that couples to another magnet on an HMD. Unfortunately, this form of coupling cannot withstand typical forces caused by active users. For example, a camera accessory coupled to a smartphone may experience jittery movement that impairs the images that it captures, or may even decouple and fall off the smartphone when a user is engaged in an activity while holding the smartphone. Accordingly, existing technologies cannot mitigate the effects of forces on an accessory mounted to an HMD to maintain a robust coupling and avoid malfunction by the accessory due to displacement of components of the accessory.

SUMMARY

Disclosed herein is at least one embodiments of a camera accessory (e.g., 360-degree field-of-view (FOV)) that includes a camera module (e.g., at least 180-degree FOV) disposed at least partially within the camera accessory and including an optical element (e.g., optical lens) configured to capture an image of a scene. The camera accessory also includes a camera barrel that at least partially surrounds the camera module to position the camera module relative to the camera accessory, a rigid structure disposed behind the camera module within the camera accessory, and a deformable structure coupled between the camera barrel and the rigid structure to maintain the position of the camera module by compensating for displacement of the camera module relative to the camera accessory.

In some embodiments, the camera accessory further comprises a mounting structure configured to mount the camera accessory on a smartphone. In some embodiments, the camera module has a camera sensor disposed behind the camera module suspended from the rigid structure by the deformable structure. In some embodiments, the deformable structure has sufficient stiffness or hardness to absorb displacement and recoil the camera module to its position relative to the camera accessory.

In some embodiments, the camera accessory further includes at least two camera modules and at least two deformable structures. Each deformable structure coupled between a respective camera barrel and the rigid structure such that each deformable structure maintains placement of each camera module by compensating for displacement of the camera module relative to the camera accessory. In some embodiments, the camera modules are opposite-facing camera modules, and the rigid structure is disposed between the opposite-facing camera modules. In some embodiments, the rigid structure is a heatsink configured to draw heat from the opposite-facing camera modules.

In some embodiments, the deformable structure has a flat surface that contacts a flat surface of the camera barrel to support the position of the camera module. In some embodiments, the camera barrel is at least partially sunken in the deformable structure. In some embodiments, the flat surface of the camera barrel is not sunken in the deformable structure.

In some embodiments, the deformable structure has a flexible surface in contact with a flat, rigid surface of the camera barrel, which is partially sunken into the deformable structure. In some embodiments, the deformable structure is configured to cause the camera module to recoil when a force is applied on the optical element.

The disclosed embodiments include a camera accessory that is mountable on a smartphone. The camera accessory includes opposite-facing camera modules, which include respective optical lenses for capturing images of different view of a scene. The camera accessory includes camera barrels such that each camera barrel at least partially surrounds a respective camera module to position the camera module relative to the camera accessory. The camera accessory further includes a heatsink disposed between the opposite-facing camera modules, and deformable structures. Each deformable structure couples a respective camera barrel and the rigid structure to exert a force that maintains the position of the camera module by compensating for displacement of the camera module relative to the camera accessory.

In some embodiments, each deformable structure is removable from the camera accessory and replaceable. In some embodiments, the deformable structures is joined to the opposite-facing camera modules without an adhesive substance by a snapping together assembly the contents of the camera accessory. In some embodiments, each camera module has a FOV of at least 180 degrees such that the collective FOV of the opposite-facing camera modules is 360 degrees.

Another embodiment is a camera accessory that has a camera module including an optical element configured to capture an image of a scene, and a deformable structure that at least partially surrounds the camera module and supports the position of the camera module and compensates for displacement of the camera module relative to the camera accessory.

This Summary is provided to introduce a selection of concepts in a simplified form that are further described below in the Detailed Description. This Summary is not intended to identify key features or essential features of the embodied subject matter, nor is it intended to limit the scope of the embodied subject matter.

BRIEF DESCRIPTION OF THE DRAWINGS

FIG. 7 illustrates a perspective view of a camera accessory with a removable deformable structure according to some embodiments of the present disclosure.

DETAILED DESCRIPTION

Figure 1B:
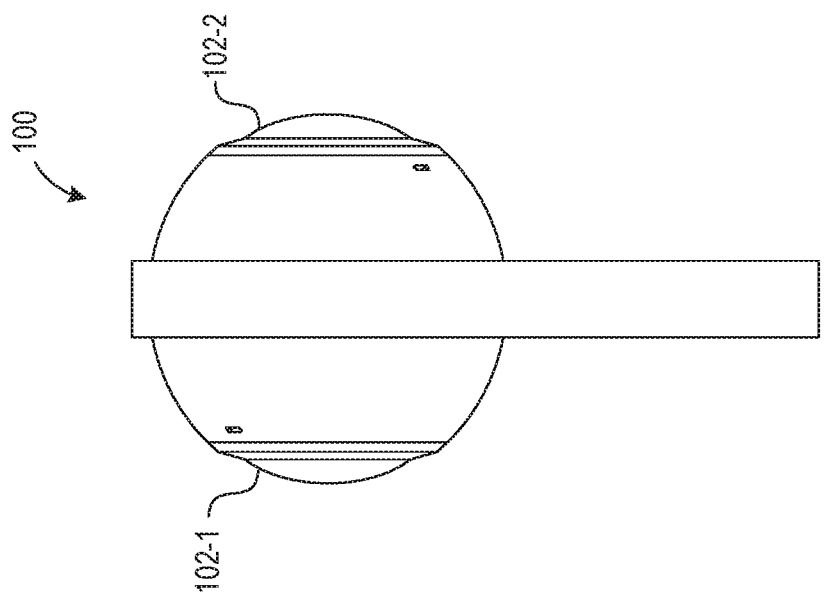
FIG. 1B illustrates a side view of the camera accessory of FIG. 1A according to some embodiments of the present disclosure.

The embodiments set forth below represent necessary information to enable those skilled in the art to practice the embodiments and illustrate the best mode of practicing the embodiments. Upon reading the following description in light of the accompanying Figures, those skilled in the art will understand the concepts of the disclosure and will recognize applications of these concepts that are not particularly addressed herein. It should be understood that these concepts and applications fall within the scope of the disclosure and the accompanying claims.

The purpose of the terminology used herein is only for describing embodiments and is not intended to limit the scope of the disclosure.

As used herein, unless specifically stated otherwise, terms such as "processing," "computing," "calculating," "determining," "displaying," "generating," or the like, refer to actions or processes of an electronic device that manipulates and transforms data, represented as physical (electronic) quantities within the computer's memory or registers, into other data similarly represented as physical quantities within the device's memory, registers, or other such storage medium, transmission, or display devices.

Reference to "one embodiment" or "an embodiment" means that a particular feature, structure, or characteristic described in connection with the embodiment is included in at least one embodiment of the disclosure. The appearances of the phrase "in one embodiment" in the specification are not necessarily all referring to the same embodiment, nor are separate or alternative embodiments necessarily mutually exclusive of other embodiments. Moreover, various features are described that may be exhibited by some embodiments and not by others. Similarly, various requirements are described that may be requirements for some embodiments and not for other embodiments.

Unless the context clearly requires otherwise, throughout the description and the embodiments, the words "comprise," "comprising," and the like are to be construed in an inclusive sense, as opposed to an exclusive or exhaustive sense; that is to say, in the sense of "including, but not limited to."

As used herein, the terms "connected," "coupled," or any variant thereof, means any connection or coupling, either direct or indirect, between two or more elements; the coupling of or connection between the elements can be physical, logical, or a combination thereof. For example, two components may be coupled directly to one another or via one or more intermediary channels or components. As another example, devices may be coupled in such a way that information can be passed there-between, while not sharing any physical connection with one another.

Additionally, the words "herein," "above," "below," and words of similar import, when used in this application, shall refer to this application as a whole and not to any particular portions of this application. Where context permits, words in the Detailed Description using the singular or plural number may also include the plural or singular number respectively. The word "or," in reference to a list of two or more items, covers all of the following interpretations of the word: any of the items in the list, all of the items in the list, and any combination of the items in the list.

The disclosed embodiments broadly relate to handheld mobile devices and related accessories. An example of a handheld mobile device (HMD) is a smartphone. An example of a related accessory is a camera or docking station that can be coupled to the HMD. The HMD and related accessory are both computing devices. However, an HMD is a standalone device whereas an accessory is a device that serves the HMD.

An HMD and related accessory are physically separate and distinct computing devices that can be coupled to transfer data and/or power wirelessly or over a wire. For example, an accessory can be coupled to an HMD by connecting a universal serial bus (USB) cable to ports of the accessory and HMD. In another example, these computing devices can be connected wirelessly over Wi-Fi or Bluetooth. A wired connection typically provides better data or power transfer but is cumbersome and inconvenient. A wireless connection is more convenient but suffers from poorer performance compared to a wired connection.

Existing technologies for coupling an HMD and related accessory are plagued with problems. For example, the coupling may require joining connectors on the devices in a particular orientation and position that has relatively low tolerance for displacement. Alternatively, coupling may require less precise joining of connectors on the device that results in a loose connection that is unreliable, easily fails, or decouples when even minor force is applied to the connection. This could also result in damage to sensitive accessories. For example, a camera accessory may be sensitive to even small forces or heat that can cause the camera to malfunction.

The disclosed embodiments overcome these drawbacks with a camera accessory that can withstand forces or heat that would otherwise cause the camera accessory to malfunction (e.g., capture blurry images). Specifically, a 360-degree camera accessory typically has a high-end camera module with a relatively large field-of-view (e.g., 210 degrees) and shallow focal length. The camera is sensitive to force and heat during assembly and while in use. Existing camera accessories include camera modules that are glued to a rigid structure such as a heatsink. This assembly is sensitive to force/heat, which causes the camera to capture blurry images.

The disclosed camera accessory overcomes these drawbacks by placing a deformable structure between two structures on opposite ends of a camera module. For example, the deformable structure could be disposed between a camera barrel that surrounds the lens of the camera module and a rigid heatsink underlying the camera module. The deformable structure can compensate for force/heat during assembly/use of the camera accessory. For example, the deformable structure can absorb a force on the camera module and cause the camera module to recoil back to its desired position without damaging the camera module.

Figure 1A:
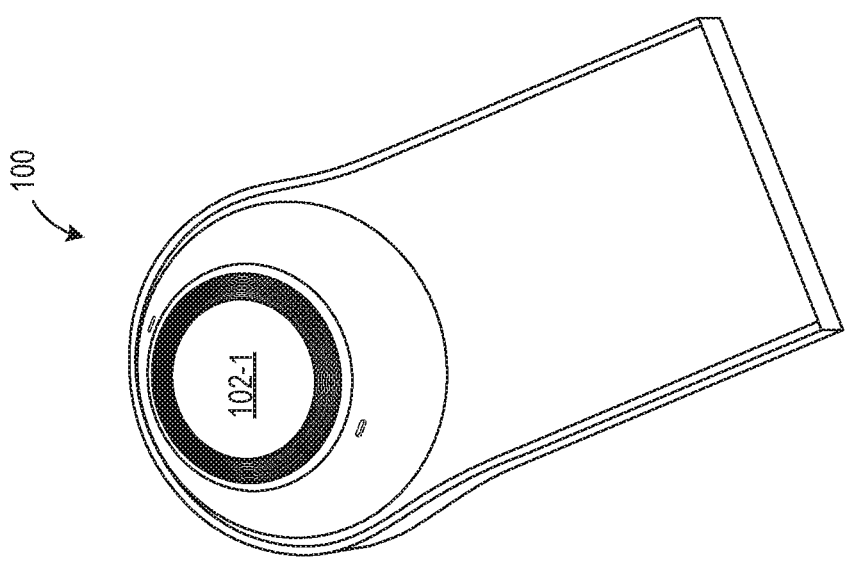
FIG. 1A illustrates a perspective view of a camera accessory according to some embodiments of the present disclosure.

In some embodiments, a camera accessory (e.g., 360-degree camera) is mountable on a smartphone to replace or augment its camera functions. For example, a camera accessory can be coupled to the smartphone via wireless gigabit connectors (e.g., SIBEAM connectors) on each of the smartphone and the camera accessory. The added functionality of a camera accessory can include a 360-degree image capture function by using a combination of wide angle lenses. For example, FIGS. 1A and 1B illustrate views of a camera accessory 100 according to some embodiments of the present disclosure. In particular, FIG. 1A illustrates a perspective view of the camera accessory 100, and FIG. 1B illustrates a side view of the camera accessory 100.

The camera accessory 100 is an imaging device configured to capture a wide field of view (FOV) of a scene. The camera accessory 100 can include any number of camera modules including respective optical lenses disposed on a surface of the camera accessory 100 and sensors toward the backside of the camera modules. As shown, the camera accessory 100 includes two camera modules with respective lenses 102-1 and 102-2. The lens 102-1 of the first camera module faces a first direction, and the lens 102-2 of the second camera faces a second direction, opposite of the first direction.

The lenses 102-1 and 102-2 collectively receive light from a wide-angle view to capture a 360-degree image of a 360-degree view. The curved three-dimensional surface of the camera accessory 100 can take on any shape, such as an ellipsoid, a spheroid, a sphere, a cube with rounded edges, or any three-dimensional shape. The lenses 102-1 and 102-2 (also referred to collectively as lenses 102) can be disposed on the camera accessory 300 in a variety of ways. As shown, the lens 102-1 may face towards a user and the lens 102-2 may face the opposite direction away from the user. In some embodiments, camera lenses can be uniformly distributed on the curved three-dimensional surface, placed at the intersection of uniformly distributed longitude and latitude lines, can be more densely distributed in some areas such as a front-facing region and/or the rear-facing region, or the like.

The camera accessory 100 can include several electronic, mechanical, or optical components well known to persons skilled in the art but not shown or described herein for the sake of brevity. For example, the camera accessory 100 can include an illumination device such as a flash. The camera accessory 100 also includes various internal components and circuitry not shown in FIGS. 1A and 1B. Further, the disclosed technology is applicable to any camera device or camera accessory.

Figure 1C:
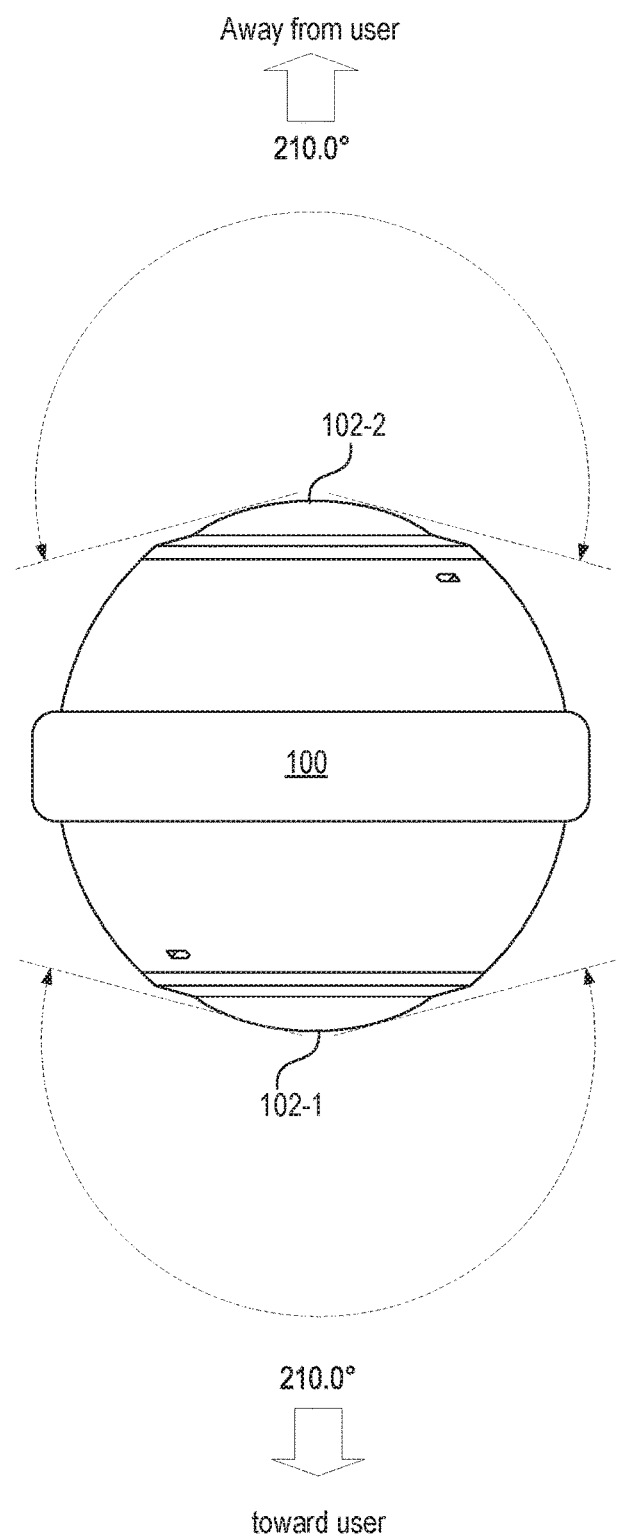
FIG. 1C illustrates a top view of the camera accessory of FIG. 1A according to some embodiments of the present disclosure.

FIG. 1C illustrates a top view of the camera accessory 100 of FIG. 1A. The top view illustrates that each lens 102-1 and 102-2 of respective camera modules have a wide FOV. In the illustrated example, each lens 102-1 and 102-2 has a FOV of 210 degrees. Accordingly, the combination of the lenses 102-1 and 102-2 can collectively have a 360-degree FOV. The camera accessory 100 can pan to any of 360-degree views (e.g., a portion of a 360-degree image) without a user needing to physically aim the camera accessory 100 in any direction. For example, when coupled to the smartphone, the user can navigate the view being displayed on a display of a smartphone on which the camera accessory 100 is mounted, via controls of the smartphone. In particular, a graphical user interface (GUI) of the smartphone may include controls that can be manipulated by the user to navigate the view of the camera accessory 100 in any direction including facing towards the user to capture a selfie image.

Figure 2:
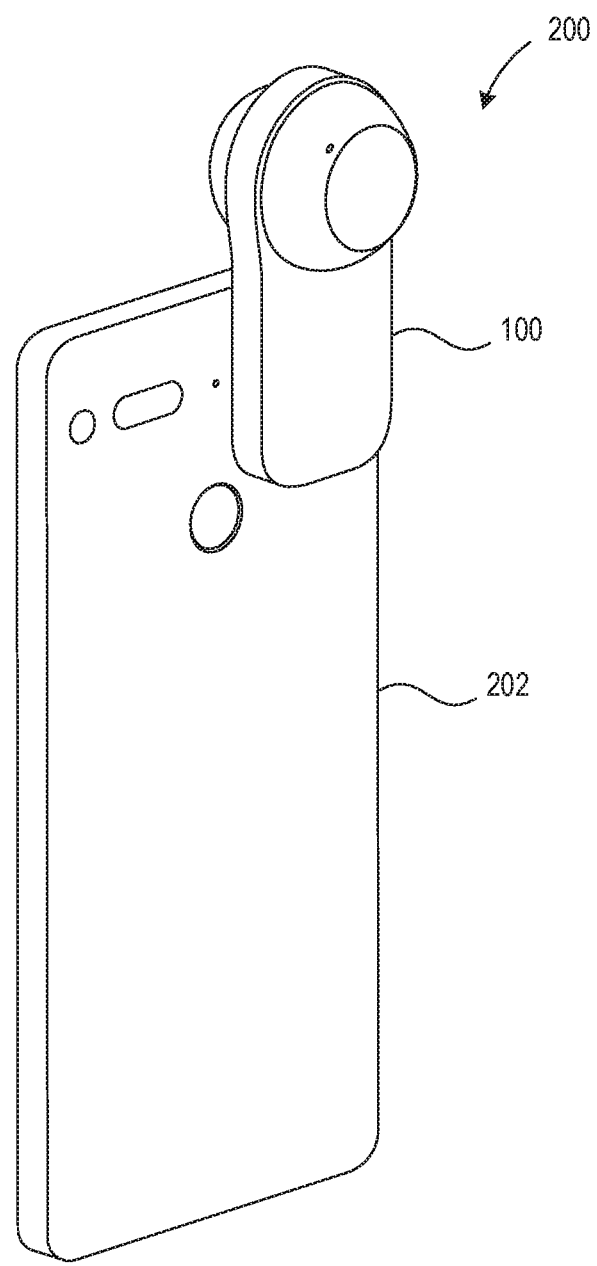
FIG. 2 illustrates an image capture system including a camera accessory mounted to a smartphone collectively configured to capture images of multiple views according to some embodiments of the present disclosure.

FIG. 2 illustrates an image capture system 200 including the camera accessory 100 mounted to the smartphone 202 collectively enabled to capture images of multiple views spanning a 360-degree FOV according to some embodiments of the present disclosure. The camera accessory 100 can be coupled to the smartphone 202 via wireless gigabit connectors (or any other connectors) on each of the camera accessory 100 and smartphone 202. The image capture system 200 is enabled to capture multiple images spanning any of 360-degrees including a view of a user on a front-facing side of the smartphone 202. The image capture system 200 is also enabled to capture images of multiple views including objects distributed at different locations relative to the image capture system 200.

The user can operate the camera accessory 100 via an interface (not shown) of the smartphone 202. For example, the interface may be a GUI that can receive user inputs including gestures such as a tap, drag, swipe, and pinch. For example, the user can drag a control on the GUI to pan from a selfie view to different views including different objects. The GUI may include another control that can be tapped by the user to cause the smartphone 202 to capture an image or video images of a current view of the camera accessory 100. In some embodiments, the GUI may include a control that allows the user to pan the camera accessory 100 from facing the user (e.g., selfie view) to facing away from the user in any other direction. Although the added functionality of a camera accessory 100 enables users to capture more views compared to conventional cameras of the smartphone 202 alone, users still lack the ability to effectively take advantage of this added functionality by capturing clear images while engaged in an activity.

The camera accessory 100 could have one or more high-end camera modules with a relatively large field-of-view (e.g., 210 degrees) and shallow focal length. The camera modules are sensitive to force and heat during assembly of the camera accessory and while in use. For example, a camera module may become dislodged from structure(s) that holds it in place, which causes the camera accessory 100 to malfunction. Solutions include camera modules that are glued to a rigid structure such as a heatsink. However, this assembly remains sensitive to force/heat, which causes the camera accessory to malfunction (e.g., capture blurry images) or break.

The disclosed embodiments overcome these drawbacks by placing a deformable structure (also referred to herein as a "spacer") between two structures on opposite ends of a camera module. For example, a spacer could be disposed between a camera barrel that surrounds the lens of the camera module and a rigid heatsink behind the camera module. The spacer can compensate for force/heat during assembly/use of the camera accessory. For example, the spacer could be made of a flexible material that could absorb a force on the camera module in various directions, and cause the camera module to recoil back to its position without damaging the camera module.

Figure 3A:
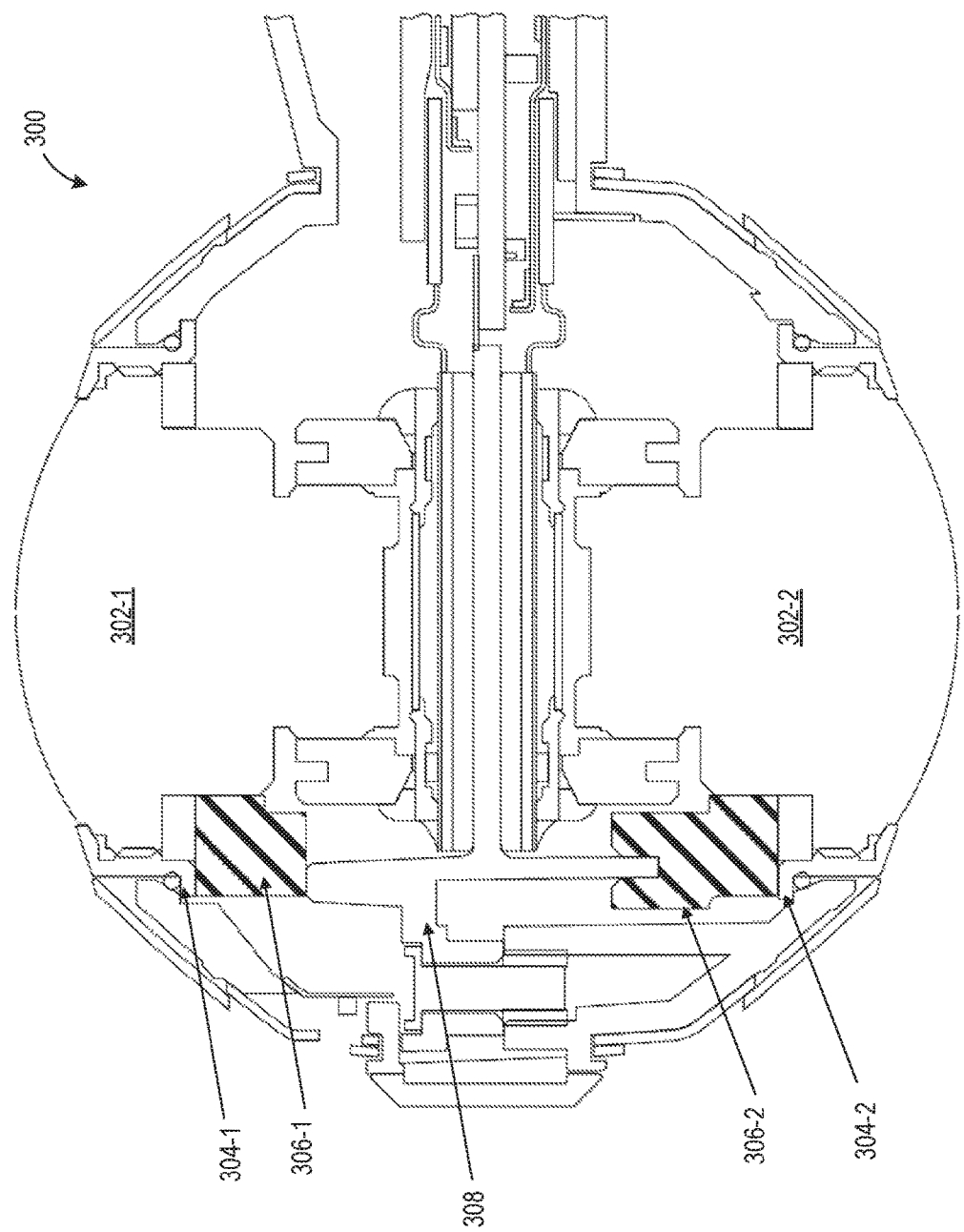
FIG. 3A illustrates a cutaway side view of a camera accessory including deformable structures that compensate for displacement of camera components according to some embodiments of the present disclosure.

For example, FIG. 3A illustrates a cutaway side view of a 360-degree camera accessory that includes a deformable structure that can accommodate displacement of components that would otherwise damage the camera accessory. As shown, the camera accessory 300 has two opposite facing camera modules 302-1 and 302-2. Each camera module has a lens (no illustrated) that is flush against the body of the camera accessory 300. The camera modules 302-1 and 302-2 are held in place by camera barrels 304-1 and 304-2, respectively. The camera accessory 300 includes spacers 306-1 and 306-2 that create outward forces on the camera barrels 304-1 and 304-2, respectively, to hold the camera modules 302-1 and 302-2 in place while compensating for forces that displace the camera modules 302-1 and 302-2.

Figure 3B:
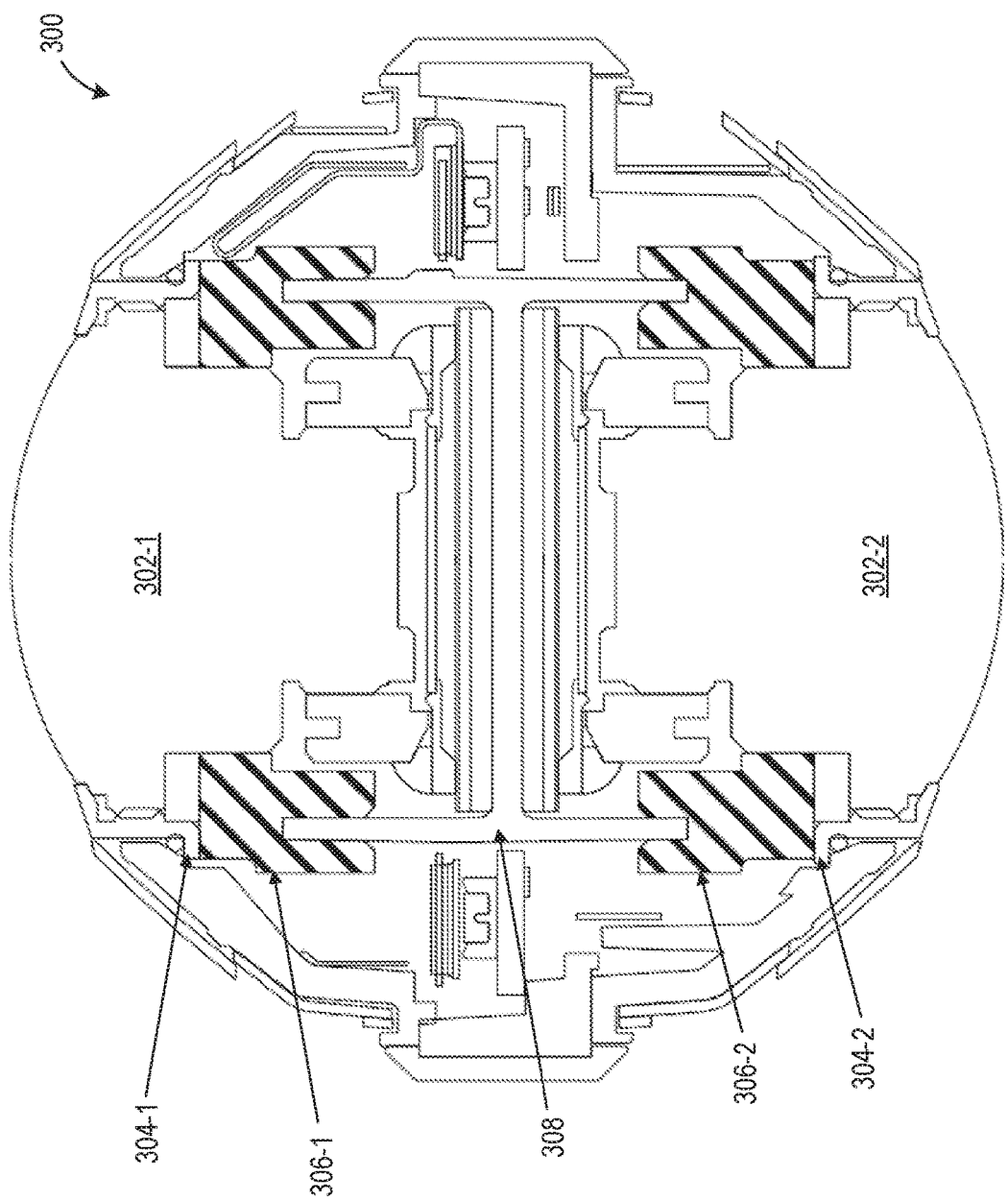
FIG. 3B illustrates a cutaway front view of the camera accessory of FIG. 3A according to some embodiments of the present disclosure.

FIG. 3B illustrates a cutaway front view of the camera accessory 300 of FIG. 3A, which includes a deformable structure. As shown, the two camera modules 302-1 and 302-2 are positioned to face opposite directions. Further, each camera module 302-1 and 302-2 is positioned by their respective spacers 306-1 and 306-2 pushing on their respective camera barrels 304-1 and 304-2. Each camera module 302-1 and 302-2 has at least a 180-degree FOV such that their combination has a 360-degree FOV.

A rigid structure is disposed between the camera modules 302-1 and 302-2. As shown, the rigid structure is a heatsink 308 that can draw heat away from the camera modules 302-1 and 302-2. In contrast, other designs may involve gluing each camera module 302-1 and 302-2 to the heatsink. Thus, the overall combination of camera modules 302 and heatsink 308 is rigid and could be more susceptible to damage from force that displace the camera modules 302. For example, the case that forms the exterior body of the camera accessory 300 is snapped-together during assembly. The force required to snap together the case of the camera accessory 300 could damage the camera modules 302. In another example, the heat generated by the camera accessory while in use can cause the camera modules 302 to move. Since the structure is rigid and intolerant to force/heat, a rigid 360-degree camera accessory readily malfunctions.

In FIGS. 3A and 3B, each spacer 306 is a deformable structure between a camera module 302's camera barrel 304 and the heatsink 308. The combination of the design/geometry of the spacer 306, the location where it is placed between the camera barrel 304 and heatsink 308, and the type of material (e.g., rubber) of which the spacer 306 is made can improve the overall performance of the camera accessory 300 to reduce the risk of malfunction. In some embodiments, a camera spacer is made of a rubber that can absorb a sufficient displacement to avoid failure or malfunction. Thus, the disclosed solution involves using a compliant (e.g., compressible) material (e.g., a rubber spacer) to constrain a rigid metal barrel, to reduce force through a camera lens on the front of a camera module and the sensor on the back of the camera module. Moreover, camera accessory 300 can be disassembled and re-assembled to, for example, change a camera module. In contrast, the assembly of conventional camera accessories cannot be disassembled because a camera module is glued to the heatsink.

A camera spacer has sufficient stiffness or hardness to compensate for displacement caused by a force that could cause the camera to lose focus. For example, a shore durometer is one of several measures of hardness of a material. Greater numbers indicate harder materials, and lower numbers indicate softer materials. Examples of a suitable shore durometer value for a deformable structure is 80. The following three embodiments show different configurations. For example, FIGS. 4A through 6B illustrate three different embodiments of camera spacer designs for camera accessories.

Figure 4A:
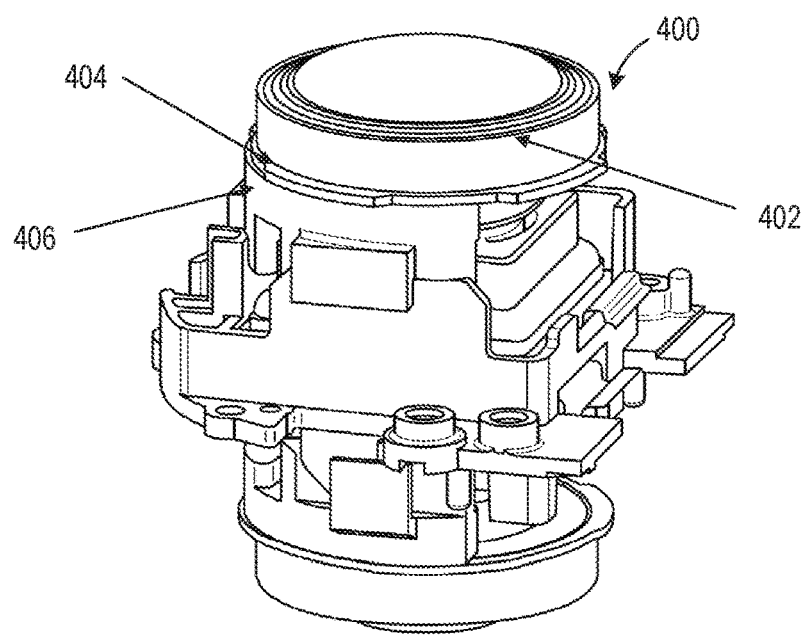
FIG. 4A illustrates a perspective view of a camera accessory including deformable structures that form flat contacts on rigid surfaces of camera barrels according to some embodiments of the present disclosure.
Figure 4B:
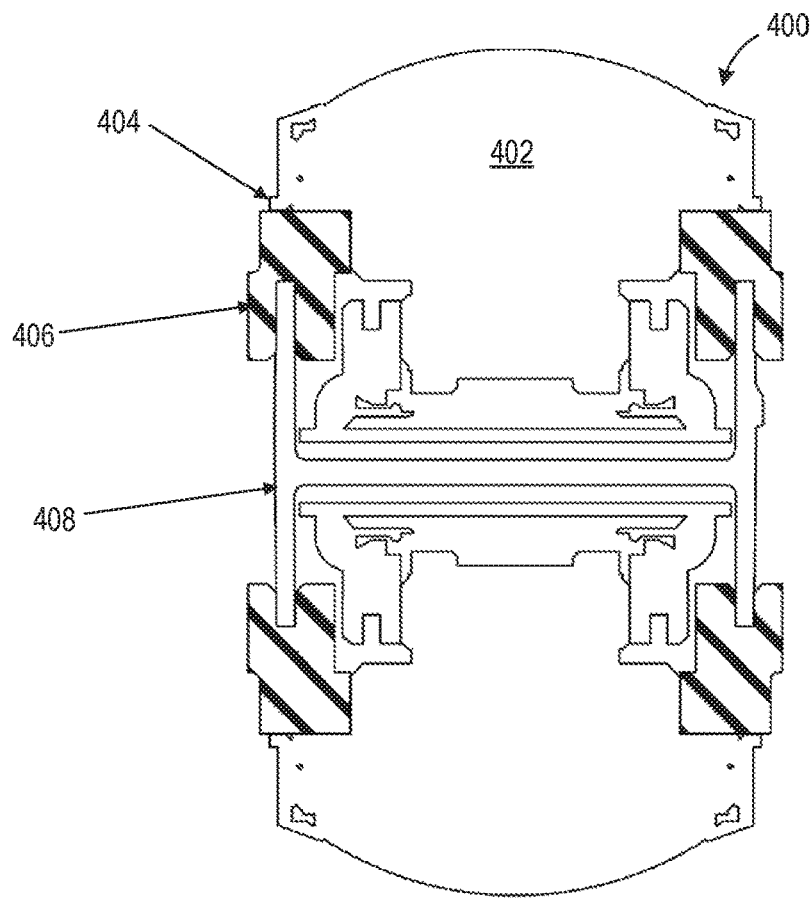
FIG. 4B illustrates a cutaway side view of the camera accessory of FIG. 4A according to some embodiments of the present disclosure.

FIG. 4A illustrates a perspective view of a camera accessory 400 that has camera spacers that form flat contact on surfaces of camera barrels of camera modules. FIG. 4B illustrates a cutaway side view of the camera accessory of FIG. 4A. For example, the camera barrel 404 could be a metal camera barrel that holds a camera module 402 and has a flat surface that interfaces without a counterpart stiff, flat surface of a spacer 406, which is held in place with a heatsink 408. Therefore, FIGS. 4A and 4B illustrate an embodiment of a camera accessory 400 that includes camera spacers (e.g., spacer 406) disposed between respective rigid barrels (e.g., camera barrel 404) holding the camera modules (e.g., camera module 402) in place and a heatsink 408. As such, the camera spacers can absorb pressure in different directions without damaging the camera accessory 400. Further, each camera spacer of this embodiment forms a flat contact such that its camera barrel is not sunken into the spacer (also referred to as not having "interference").

Figure 5A:
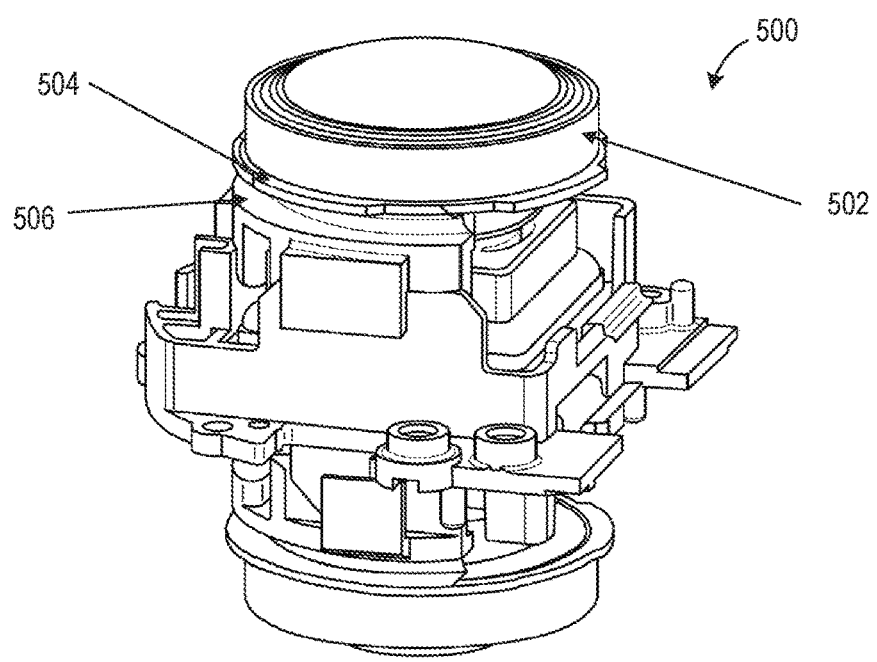
FIG. 5A illustrates a perspective view of a camera accessory including deformable structures that flexibly contact flat, rigid surfaces of camera barrels sunken into the deformable structures according to some embodiments of the present disclosure.
Figure 5B:
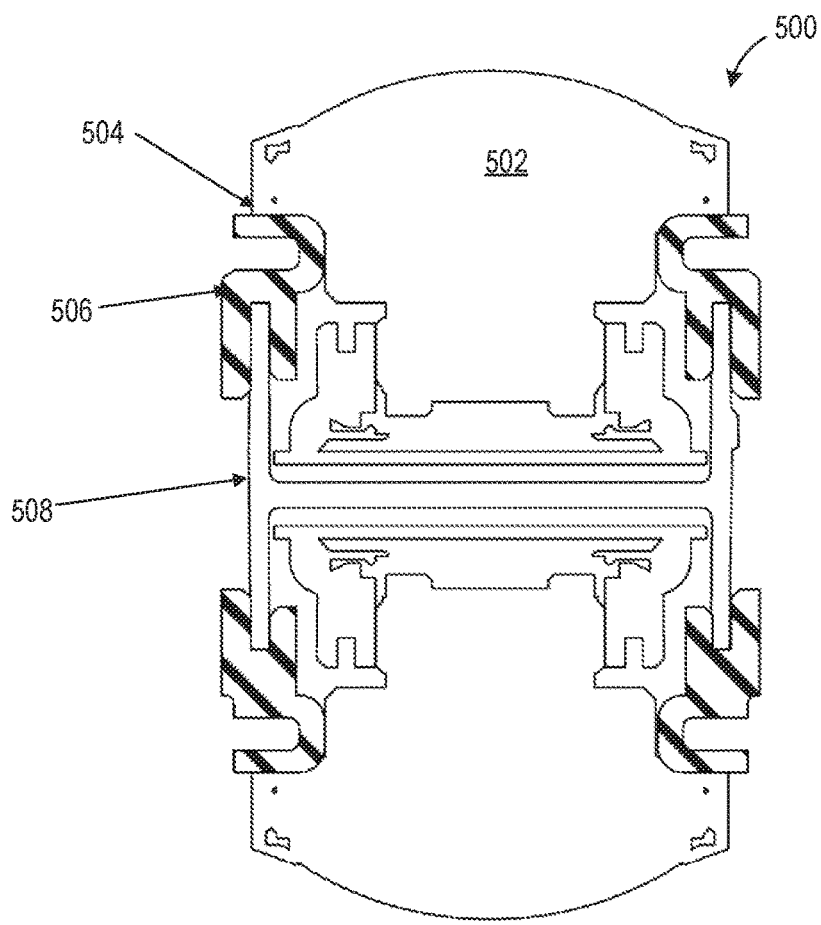
FIG. 5B illustrates a cutaway side view of the camera accessory of FIG. 5A according to some embodiments of the present disclosure.

FIG. 5A illustrates a perspective view of a camera accessory 500 including spacers 506 that more flexibly contact flat, rigid surfaces of camera barrels 504 that hold the camera modules 502 in place. The interface between a spacer 506 and the camera barrel 504 has some interference such that the camera barrel 504 is somewhat sunken (e.g., 0.5 mm) into the spacer 506 for added force to secure these components while enabling added elasticity/recoil. FIG. 5B illustrates a cutaway side view of the camera accessory of FIG. 5A according to some embodiments of the present disclosure.

Figure 6A:
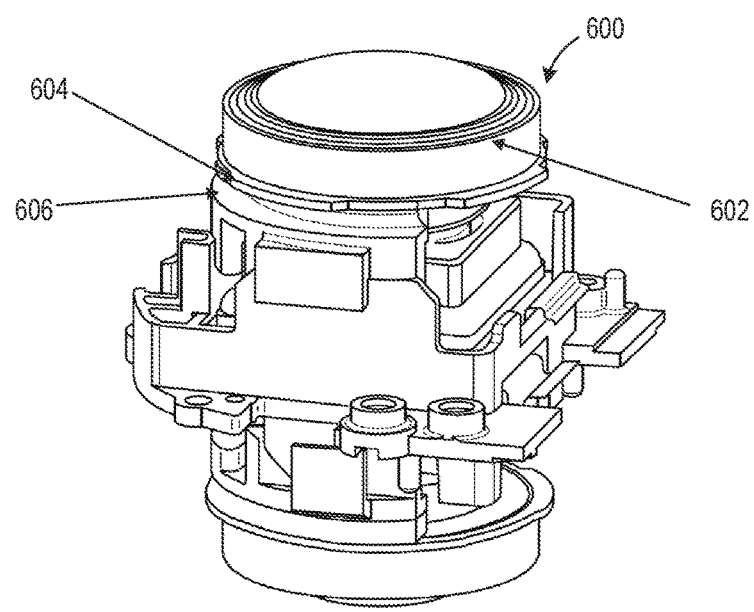
FIG. 6A illustrates a perspective view of a camera accessory including deformable structures that form flat contacts on surfaces of camera barrels sunken into the deformable structures according to some embodiments of the present disclosure.
Figure 6B:
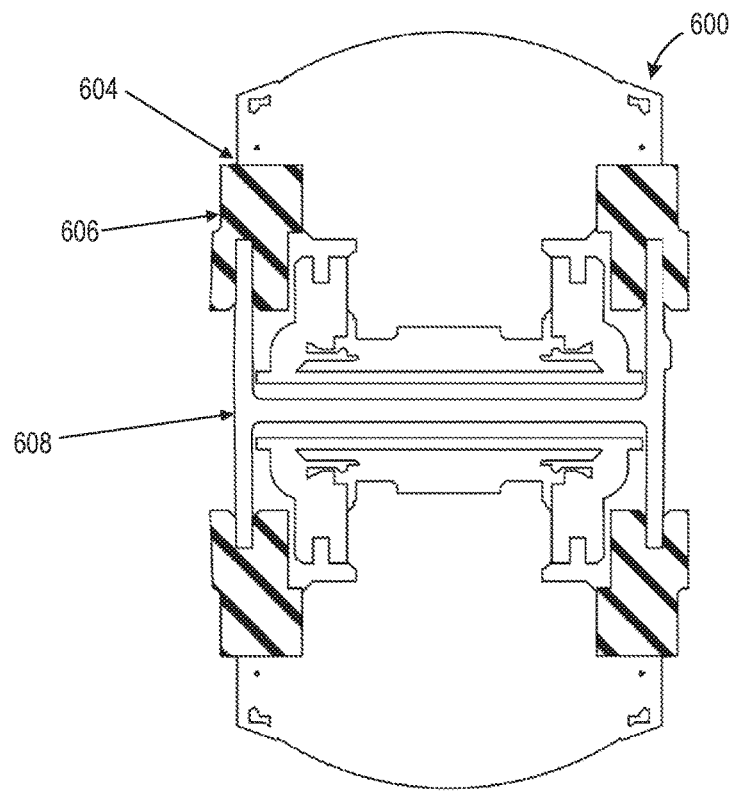
FIG. 6B illustrates a cutaway side view of the camera accessory of FIG. 6A according to some embodiments of the present disclosure.

FIG. 6A illustrates a perspective view of a camera accessory 600 that has spacers that form flat contacts on surfaces of camera barrels and have some interference. FIG. 6B illustrates a cutaway side view of the camera accessory 600 of FIG. 6A. As shown, each camera spacer 606 forms a flat contact with the surface of a respective camera barrel 604. The interface between the camera spacer 606 and camera barrel 604 has some interference such that the camera barrel 604 is somewhat sunken (e.g., 0.5 mm) into the camera spacer 606. This embodiment may be more suitable for mass production because the structure is more readily assembled.

FIG. 7 illustrates a perspective view of a camera accessory with a removable camera spacer. The camera spacer 702 can be disposed in a designated location of the camera accessory 700. Then, as shown, the camera spacer 702 can be fully removed from the camera accessory 700 and replaced with another or the same camera spacer 702. As such, for example, the camera spacer 702 can be temporarily removed to perform maintenance or repairs without destroying the camera accessory 700.

Figure 8:
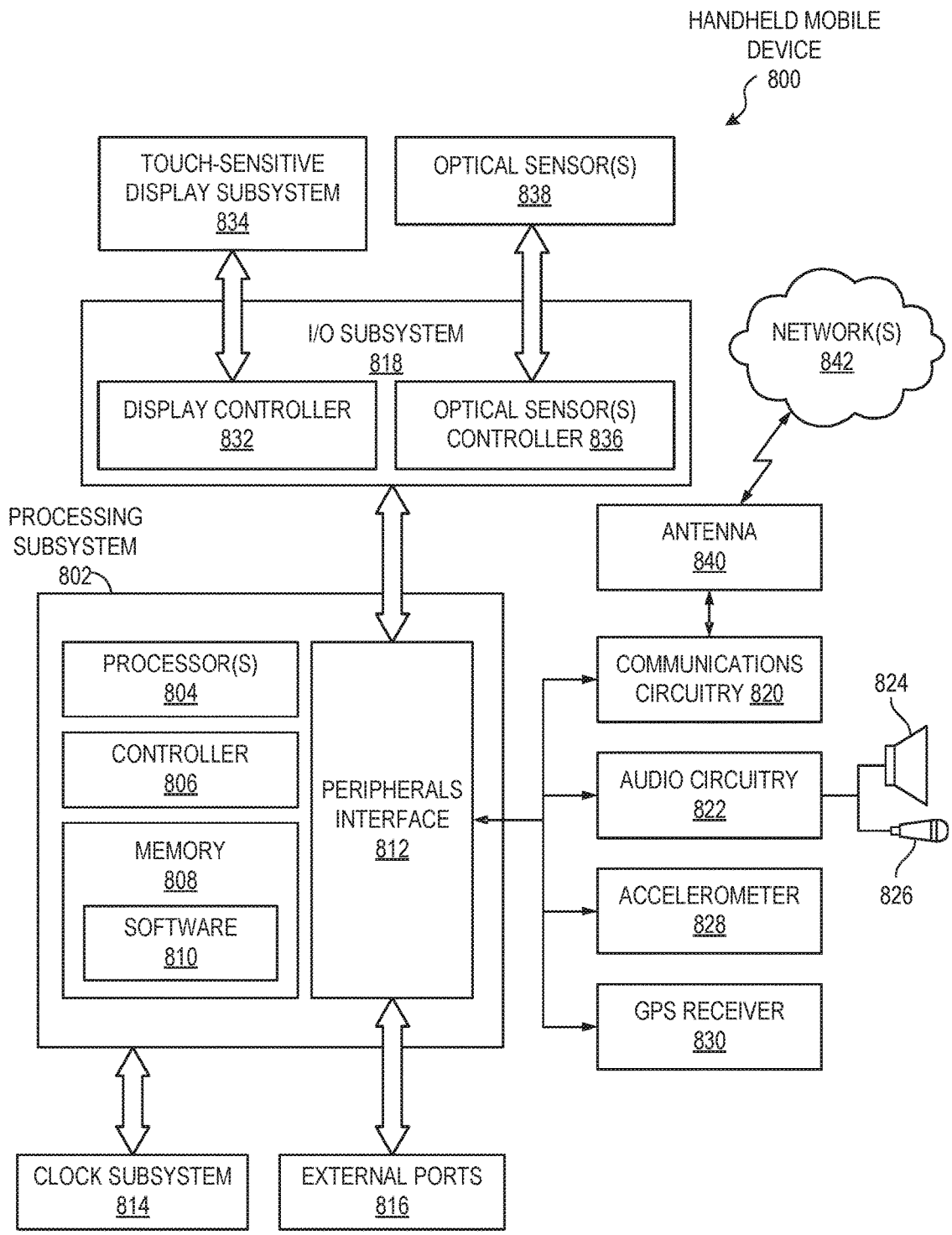
FIG. 8 is a block diagram illustrating an example of a computing device in which aspects of the disclosed technology can be embodied.

FIG. 8 is a block diagram illustrating an example HMD in which aspects of the disclosed technology can be embodied. The HMD 800 may include generic components and/or components specifically designed to carry out the disclosed features. The HMD 800 may be a standalone device (e.g., smartphone 202) or an accessory (e.g., camera accessory 100) of a system. For example, components of the HMD 800 may be included in or coupled to a system-on-chip (SOC), a single-board computer (SBC) system, a desktop or laptop computer, a kiosk, a mainframe, a mesh of computer systems, or combinations thereof.

In some embodiments, the HMD 800 can operate as a server device or a client device in a client-server network environment, or as a peer machine in a peer-to-peer system. In some embodiments, the HMD 800 may perform one or more steps of the disclosed embodiments in real-time, near real-time, offline, by batch processing, or combinations thereof.

The HMD 800 includes a processing subsystem 802 that includes one or more processors 804 (e.g., central processing units (CPUs), application specific integrated circuits (ASICs), and/or field programmable gate arrays (FPGAs)), a memory controller 806, memory 808 that can store software 810, and a peripherals interface 812. The memory 808 may include volatile memory (e.g., random-access memory (RAM)) and/or non-volatile memory (e.g., read-only memory (ROM)). The memory 808 can be local, remote, or distributed. The HMD 800 can also include a clock subsystem 814 that controls a timer for use in some embodiments. The components of the HMD 800 are interconnected over a bus (not shown) operable to transfer data between hardware components.

The peripherals interface 812 is coupled to one or more external ports 816, which can connect to an external power source, for example. The peripherals interface 812 is also coupled to an I/O subsystem 818. Other components coupled to the peripherals interface 812 include communications circuitry 820, audio circuitry 822 for a speaker 824 and a microphone 826, an accelerometer 828, a GPS receiver 830 (or global navigation satellite System (GLONASS) or other global navigation system receiver), and other sensors (not shown). The GPS receiver 830 is operable to receive signals concerning the geographic location of the HMD 800. The accelerometer 828 can be operable to obtain information concerning the orientation (e.g., portrait or landscape) of the HMD 800.

The I/O subsystem 818 includes a display controller 832 operative to control a touch-sensitive display subsystem 834, which further includes the touch-sensitive display of the HMD 800. The I/O subsystem 818 also includes optical sensor(s) controller 836 for one or more optical sensors 838 of the HMD 800. The I/O subsystem 818 includes other components to control physical buttons such as a "home" button.

The communications circuitry 820 can configure or reconfigure the antenna 840 of the HMD 800. In some embodiments, the antenna 840 can be structurally integrated with the HMD 800 (e.g., embedded in the housing or display screen) or coupled to the HMD 800 through the external ports 816. The communications circuitry 820 can convert electrical signals to/from electromagnetic signals that are communicated by the antenna 840 to network(s) 842 or other devices. For example, the communications circuitry 820 can include radio frequency (RF) circuitry that processes RF signals communicated by the antenna 840.

The communications circuitry 820 can include circuitry for performing well-known functions such as an RF transceiver, one or more amplifiers, a tuner, oscillators, a digital signal processor, a CODEC chipset, a subscriber identity module (SIM card or eSIM), and so forth. The communications circuitry 820 may communicate wirelessly via the antenna 840 with the network(s) 842 (e.g., the Internet, an intranet and/or a wireless network, such as a cellular network, a wireless local area network (LAN) and/or a metropolitan area network (MAN)) or other devices.

The software 810 can include an operating system (OS) software program, application software programs, and/or modules such as a communications module, a GPS module, and the like. For example, the GPS module can estimate the location of an HMD based on the GPS signals received by the GPS receiver 830. The GPS module can provide this information to components of the HMD for use in various applications (e.g., to provide location-based services).

A software program, when referred to as "implemented in a computer-readable storage medium," includes computer-readable instructions stored in the memory (e.g., memory 808). A processor (e.g., processor 804) is "configured to execute a software program" when at least one value associated with the software program is stored in a register that is readable by the processor. In some embodiments, routines executed to implement the disclosed embodiments may be implemented as part of OS software (e.g., MICROSOFT WINDOWS and LINUX) or a specific software application, component, program, object, module, or sequence of instructions referred to as "computer programs."

Computer programs typically comprise one or more instructions set at various times in various memory devices of a computing device (e.g., HMD 800), which, when read and executed by at least one processor (e.g., processor 804), will cause the HMD 800 to execute functions involving the disclosed embodiments. In some embodiments, a carrier containing the aforementioned computer program product is provided. The carrier is one of an electronic signal, an optical signal, a radio signal, or a non-transitory computer-readable storage medium (e.g., the memory 808).

Operation of a memory device (e.g., memory 808), such as a change in state from a binary one (1) to a binary zero (0) (or vice versa) may comprise a visually perceptible physical change or transformation. The transformation may comprise a physical transformation of an article to a different state or thing. For example, a change in state may involve accumulation and storage of charge or a release of stored charge. Likewise, a change of state may comprise a physical change or transformation in magnetic orientation or a physical change or transformation in molecular structure, such as a change from crystalline to amorphous or vice versa.

Aspects of the disclosed embodiments may be described in terms of algorithms and symbolic representations of operations on data bits stored in memory. These algorithmic descriptions and symbolic representations generally include a sequence of operations leading to a desired result. The operations require physical manipulations of physical quantities. Usually, though not necessarily, these quantities take the form of electric or magnetic signals that are capable of being stored, transferred, combined, compared, and otherwise manipulated. Customarily, and for convenience, these signals are referred to as bits, values, elements, symbols, characters, terms, numbers, or the like. These and similar terms are associated with physical quantities and are merely convenient labels applied to these quantities.

The HMD 800 may include other components that are not shown nor further discussed herein for the sake of brevity. One having ordinary skill in the art will understand any hardware and software that is included but not shown in FIG. 8. While embodiments have been described in the context of fully functioning handheld devices, those skilled in the art will appreciate that the various embodiments are capable of being distributed as a program product in a variety of forms and that the disclosure applies equally, regardless of the particular type of machine or computer-readable media used to actually effect the embodiments.

While the disclosure has been described in terms of several embodiments, those skilled in the art will recognize that the disclosure is not limited to the embodiments described herein and can be practiced with modifications and alterations within the spirit and scope of the invention. Those skilled in the art will also recognize improvements to the embodiments of the present disclosure. All such improvements are considered within the scope of the concepts disclosed herein. Thus, the description is to be regarded as illustrative instead of limiting.

The invention claimed is:

1. A camera accessory comprising:
   a camera module disposed at least partially within the camera accessory and including an optical element configured to capture an image of a scene;
   a camera barrel that at least partially surrounds the camera module to position the camera module relative to the camera accessory;
   a rigid structure within the camera accessory and disposed behind the camera module; and
   a deformable structure coupled between the camera barrel and the rigid structure to maintain the position of the camera module by compensating for displacement of the camera module relative to the camera accessory.

2. The camera accessory of claim 1 further comprises:
   a mounting structure configured to mount the camera accessory on a smartphone.

3. The camera accessory of claim 1, wherein a field of view of the camera accessory is 360-degrees.

4. The camera accessory of claim 1, wherein a field of view of the camera module is at least 180 degrees.

5. The camera accessory of claim 1, wherein the optical element is an optical lens.

6. The camera accessory of claim 5, wherein the camera module has a camera sensor disposed behind the camera module suspended from the rigid structure by the deformable structure.

7. The camera accessory of claim 1 further comprises:
   a plurality of camera modules including the camera module; and
   a plurality of deformable structures including the deformable structure, wherein each deformable structure coupled between a respective camera barrel and the rigid structure such that each deformable structure maintains placement of each camera module by compensating for displacement of the camera module relative to the camera accessory.

8. The camera accessory of claim 7, wherein the plurality of camera modules is a plurality of opposite-facing camera modules, and the rigid structure is disposed between the plurality of opposite-facing camera modules.

9. The camera accessory of claim 8, wherein the rigid structure is a heatsink configured to draw heat from the plurality of opposite-facing camera modules.

10. The camera accessory of claim 1, wherein the deformable structure has sufficient stiffness or hardness to absorb displacement and recoil the camera module to its position relative to the camera accessory.

11. The camera accessory of claim 1, wherein the deformable structure has a flat surface that contacts a flat surface of the camera barrel to support the position of the camera module.

12. The camera accessory of claim 11, wherein the camera barrel is at least partially sunken in the deformable structure.

13. The camera accessory of claim 11, wherein the flat surface of the camera barrel is not sunken in the deformable structure.

14. The camera accessory of claim 1, wherein the deformable structure has a flexible surface in contact with a flat, rigid surface of the camera barrel, which is partially sunken into the deformable structure.

15. The camera accessory of claim 1, wherein the deformable structure is configured to cause the camera module to recoil when a force is applied on the optical element.

16. A camera accessory mountable on a smartphone, the camera accessory comprising:
   a plurality of opposite-facing camera modules including respective optical lenses for capturing images of different view of a scene;
   a plurality of camera barrels such that each camera barrel at least partially surrounds a respective camera module to position the camera module relative to the camera accessory;
   a heatsink disposed between the plurality of opposite-facing camera modules; and
   a plurality of deformable structures such that each deformable structure couples a respective camera barrel and the rigid structure to exert a force that maintains the position of the camera module by compensating for displacement of the camera module relative to the camera accessory.

17. The camera accessory of claim 16, wherein each deformable structure is removable from the camera accessory and replaceable.

18. The camera accessory of claim 16, wherein the plurality of deformable structures is joined to the plurality of opposite-facing camera modules without an adhesive substance by a snapping together assembly the contents of the camera accessory.

19. The camera accessory of claim 16, wherein each camera module has a field-of-view of at least 180 degrees such that a collective field of view of the plurality of opposite-facing camera modules is 360 degrees.

20. A camera accessory comprising:
   a camera module including an optical element configured to capture an image of a scene; and
   a deformable structure that at least partially surrounds the camera module and supports the position of the camera module and compensates for displacement of the camera module relative to the camera accessory.

\* \* \* \* \*